(12) United States Patent
Bliley et al.

(10) Patent No.: US 7,418,604 B2
(45) Date of Patent: Aug. 26, 2008

(54) SYSTEM AND METHOD FOR POWERING ON AFTER VERIFYING PROPER OPERATION OF A CHARGE PUMP AND VOLTAGE REGULATOR

(75) Inventors: Paul D. Bliley, Vancouver, WA (US); Bill Eaton, Vancouver, WA (US); Maxwell DeHaven, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 11/021,083

(22) Filed: Dec. 22, 2004

(65) Prior Publication Data

US 2006/0136154 A1 Jun. 22, 2006

(51) Int. Cl.
*G06F 1/00* (2006.01)
*G06F 9/00* (2006.01)
*G06F 19/00* (2006.01)
*G01R 31/00* (2006.01)

(52) U.S. Cl. ............................ 713/300; 713/1; 713/323; 702/58

(58) Field of Classification Search ................. 713/300, 713/323, 1; 702/58
See application file for complete search history.

(56) References Cited

U.S. PATENT DOCUMENTS

| | | | |
|---|---|---|---|
| 4,554,661 A * | 11/1985 | Bannister ................... 714/45 |
| 5,283,792 A | 2/1994 | Davies, Jr. et al. |
| 5,475,847 A | 12/1995 | Ikeda |
| 5,557,738 A * | 9/1996 | Townsley et al. .............. 714/14 |
| 5,617,572 A | 4/1997 | Pearce et al. |
| 5,757,170 A * | 5/1998 | Pinney ...................... 323/266 |
| 5,765,001 A * | 6/1998 | Clark et al. ................ 713/340 |
| 5,822,514 A * | 10/1998 | Steinz et al. ................. 714/49 |
| 5,996,082 A * | 11/1999 | Cortopassi .................. 713/321 |
| 6,011,383 A | 1/2000 | Dean et al. |
| 6,097,241 A | 8/2000 | Bertin et al. |
| 6,097,243 A | 8/2000 | Bertin et al. |
| 6,205,565 B1 * | 3/2001 | Bissett et al. ................. 714/49 |
| 6,223,293 B1 * | 4/2001 | Foster et al. ................ 713/300 |
| 6,226,556 B1 * | 5/2001 | Itkin et al. .................... 700/21 |
| 6,393,570 B1 | 5/2002 | Henderson et al. |
| 6,471,651 B1 | 10/2002 | Hwang et al. |
| 6,477,654 B1 | 11/2002 | Dean et al. |
| 6,915,441 B2 * | 7/2005 | Maciorwski et al. ........ 713/340 |
| 6,950,960 B2 * | 9/2005 | Mohammad ................ 713/600 |

(Continued)

FOREIGN PATENT DOCUMENTS

EP 1416381 5/2004

(Continued)

OTHER PUBLICATIONS

European Search Report for Application No. 05257783.0; Report issued May 8, 2008.

*Primary Examiner*—Thomas Lee
*Assistant Examiner*—Jaweed A Abbaszadeh

(57) ABSTRACT

Embodiments of methods, apparatuses, devices and systems associated with a power management system are disclosed. In one such embodiment, a power management system includes a state machine, capable of transitioning the power management system to a safe state when an input signal and/or an output signal from a component of the power management system indicates occurrence of an error in the component.

28 Claims, 7 Drawing Sheets

U.S. PATENT DOCUMENTS

| | | | |
|---|---|---|---|
| 7,043,650 B2 * | 5/2006 | Bresniker et al. | 713/324 |
| 7,069,473 B2 * | 6/2006 | Yasuda | 714/37 |
| 7,124,307 B2 * | 10/2006 | Sugita et al. | 713/300 |
| 7,134,029 B2 * | 11/2006 | Hepner et al. | 713/300 |
| 7,137,020 B2 * | 11/2006 | Gilstrap et al. | 713/324 |
| 7,139,937 B1 * | 11/2006 | Kilbourne et al. | 714/47 |
| 2002/0149263 A1 | 10/2002 | Blanco et al. | |
| 2003/0063193 A1 | 4/2003 | Hongou | |
| 2003/0070114 A1 * | 4/2003 | Yasuda | 714/20 |
| 2003/0122811 A1 | 7/2003 | Hu | |
| 2003/0126473 A1 * | 7/2003 | Maciorowski et al. | 713/300 |
| 2004/0054938 A1 * | 3/2004 | Belady et al. | 713/300 |
| 2004/0064747 A1 * | 4/2004 | Haider | 713/330 |
| 2005/0102539 A1 * | 5/2005 | Hepner et al. | 713/300 |
| 2005/0188230 A1 * | 8/2005 | Bilak | 713/300 |
| 2006/0117192 A1 * | 6/2006 | Nokkonen | 713/300 |

FOREIGN PATENT DOCUMENTS

| | | |
|---|---|---|
| JP | 09258865 | 10/1997 |
| JP | 2001/047693 | 2/2001 |
| JP | 2002/178610 | 6/2002 |
| WO | WO01/65345 | 9/2001 |

* cited by examiner

SYSTEM AND METHOD FOR POWERING ON AFTER VERIFYING PROPER OPERATION OF A CHARGE PUMP AND VOLTAGE REGULATOR

BACKGROUND

Electrical and/or electronic circuits operate using a power source. Some power sources provide direct current (DC) electricity in the form of DC current and/or DC voltage. An associated issue with such electrical and/or electronic circuits may be lower power operation modes and/or well-defined power initiation sequences. Low power operation modes may assist manufacturers in complying with regulations designed to result in lower power consumption. Such regulations continue to lower the power consumption standards for electronics, computer equipment, computers, monitors and/or peripherals, such as printers, appliances, and the like. Meeting these regulations can cause difficulty with attaining design objectives, such as cost, complexity, and size.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, methods, procedures, components and/or circuits that would be understood by one of ordinary skill have not been described in detail so as not to obscure the described embodiments of claimed subject matter.

Reference throughout this specification to "one embodiment" and/or "an embodiment" means that a particular feature, structure, and/or characteristic described may be included in at least one embodiment. Thus, the appearance of the phrases "in one embodiment" or "in an embodiment" in various places throughout this specification typically do not refer to one particular embodiment or the same embodiment. Furthermore, various features, structures, and/or characteristics described through out this specification may be combined in any suitable manner in one or more embodiments.

Figure 1:
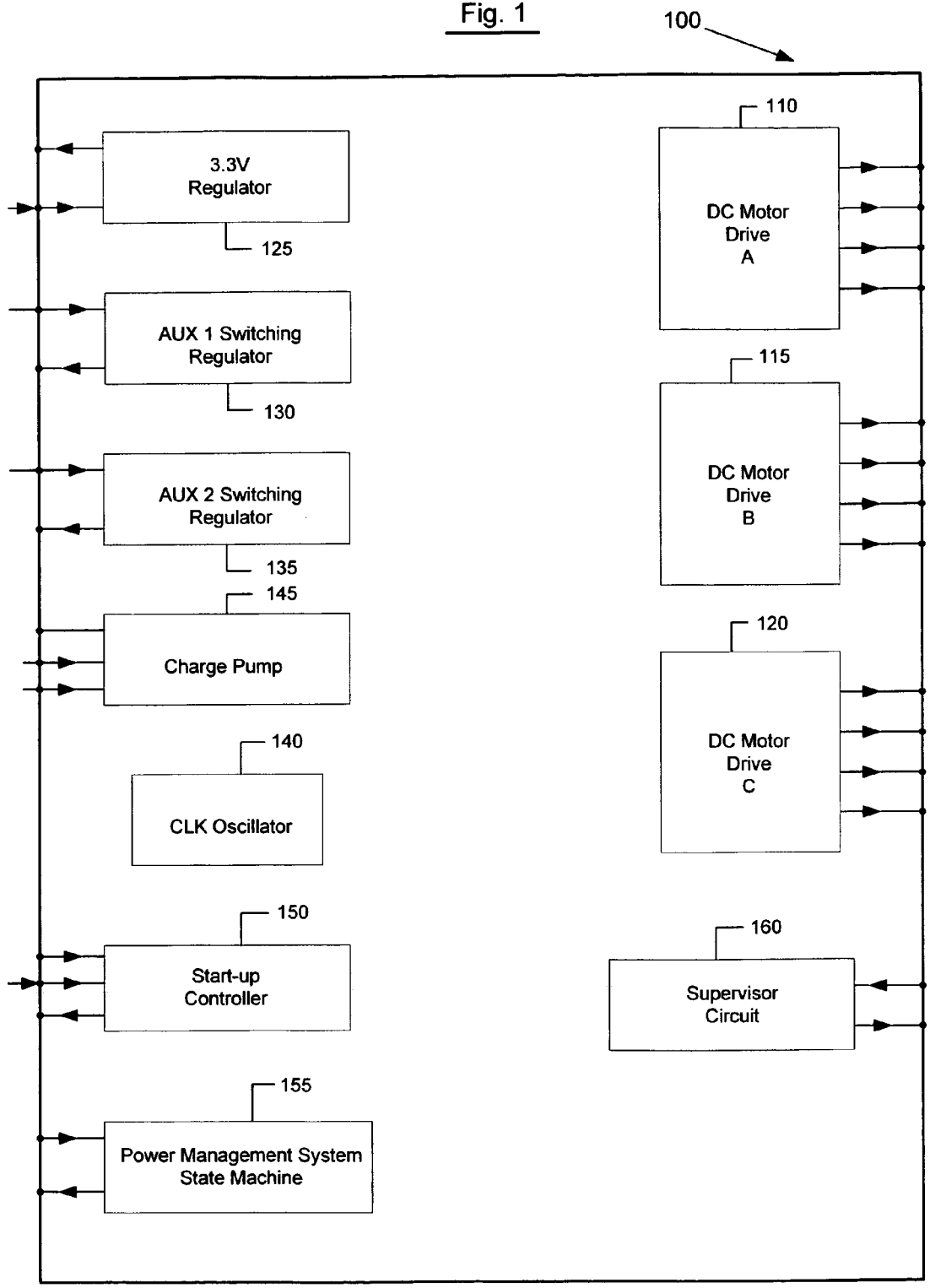
FIG. 1 is a schematic diagram illustrating one embodiment of an integrated circuit.

FIG. 1 is a schematic diagram illustrating an embodiment 100 of a power management system of an integrated circuit (IC), although claimed subject matter is not limited in scope to this particular embodiment. For example, alternative embodiments may or may not be embodied in or on one or even more than one IC. This particular embodiment, however, includes an IC that incorporates switching power devices, such as, for this embodiment, switching motor drive circuits, such as 110, 115 and 120, and switching voltage regulators, such as 125, 130 and 135. Embodiment 100 also includes a charge pump 145 and a clock oscillator 140. Embodiment 100 may further include a startup controller 150, a state machine, such as a power management system state machine 155, and a supervisor circuit 160. The state machine may be implemented in a variety of ways including but not limited to an application specific integrated circuit, a component of an application specific integrated circuit, and/or a computing device executing instructions that may be stored in any variety of storage media, to name but a few examples. It should be noted that claimed subject matter is not limited to specific implementations of the state machine. In this context, a switching power device refers to a circuit or component of a circuit that regulates and/or modulates power wherein an aspect of that regulation and/or modulation relates to signals that switch or change between distinct electrical levels, such as current levels and/or voltage levels, for example.

Although claimed subject matter is not limited in scope in this respect, embodiment 100 includes voltage regulators that comprise DC-DC voltage regulators. In this embodiment, for example, 32 volts DC (not shown) is to be applied to embodiment 100, whereas switching voltage regulator 125 comprises a 3.3 volt switching regulator. Likewise, in this particular embodiment, auxiliary regulators 130 and 135 also comprise DC-DC voltage regulators, although other regulators may alternatively be employed, such as AC-DC or AC-AC regulators, for example, depending on the particular application involved. In this embodiment, regulators 130 and 135 may be employed to produce a higher or lower output voltage level other than 3.3 volts DC, if desired. It is noted, therefore, that these voltage values are merely examples and are not intended in any way to limit the scope of claimed subject matter. Thus, switching voltage regulators may provide any desired voltage level or a plurality of voltage levels. Likewise, a host of potential architectures are available for switching regulators, including, without limitation, buck converters, regulators that employ feedback, push-pull voltage regulators, and the like.

Although claimed subject matter is not limited in scope in this respect, startup controller 150 may comprise a circuit or circuit component that may regulate a startup sequence for embodiment 100. Startup controller 150 may comprise a separate circuit or may be included as component of a larger circuit as shown in embodiment 100, for example. It is noted however that claimed subject matter is not limited to a particular embodiment of startup controller 150. Likewise, alternative embodiments may or may not be embodied in or on one or even more than one IC.

Embodiment 100 may be initiated by an external event, e.g., an event that may be initiated outside of embodiment 100, such as a user pressing an "on" button on an apparatus in which embodiment 100 is employed, for example, although of course claimed subject matter is not limited in scope in that respect. In this context an external event may be any event that originates outside of embodiment 100, such as, but in no way limited to the examples provided above and below, for example. Initiating embodiment 100 may result in a system supply voltage, such as 32 volts DC for example, and an initiation supply voltage, such as an analog biasing voltage, to be applied to startup controller 150. At a time in which the system supply voltage and the initiation supply voltage both exceed an activation threshold, such as an under-voltage lock-out (UVLO) threshold, startup controller 150 may generate an output signal that may be supplied to charge pump 145. Charge pump 145 may therefore be initiated by the output signal of startup controller 150 in this embodiment. Charge pump 145 may then generate an output signal, or signals, to be applied to one and/or more of voltage regulators 125, 130, and 135, for example, though claimed subject matter is not limited in this respect.

Supervisor circuit 160 may monitor input signals, input ports, output signals and/or output ports of the above described circuit components, such as switching voltage regulators 125, 130 and 135, charge pump 145, and switching motor drive circuits 110, 115 and 120, for example. If no errors are indicated in the input signals and/or output signals of any of the above circuits supervisor circuit 160 may move embodiment 100 into a full power mode in which all circuit components are provided with sufficient voltage to function as desired, depending for example on a circuit environment for embodiment 100. In this context, the term error refers to any one or any combination of the input signals and/or output signals of the circuits of an embodiment or any components thereof being outside a desired range. Embodiment 100 may be employed as part of a printer, a computer, a home appliance, a digital camera, such as a digital still or a digital video camera, a cell phone, a personal digital assistant, a television, a radio, a DVD player, a CD player, a cassette player, a hard drive, a DVD burner, a CD burner, a floppy drive, an electronic game device, etc. In some applications, of course, alternate startup sequences may be employed. It is noted, therefore, that the startup sequence discussed above is merely an example and is not intended in any way to limit the scope of claimed subject matter. Though depicted as a separate circuit component above, that is merely an example of the supervisor circuit and supervisor circuit logic and in no way is intended to limit claimed subject matter.

Figure 2:
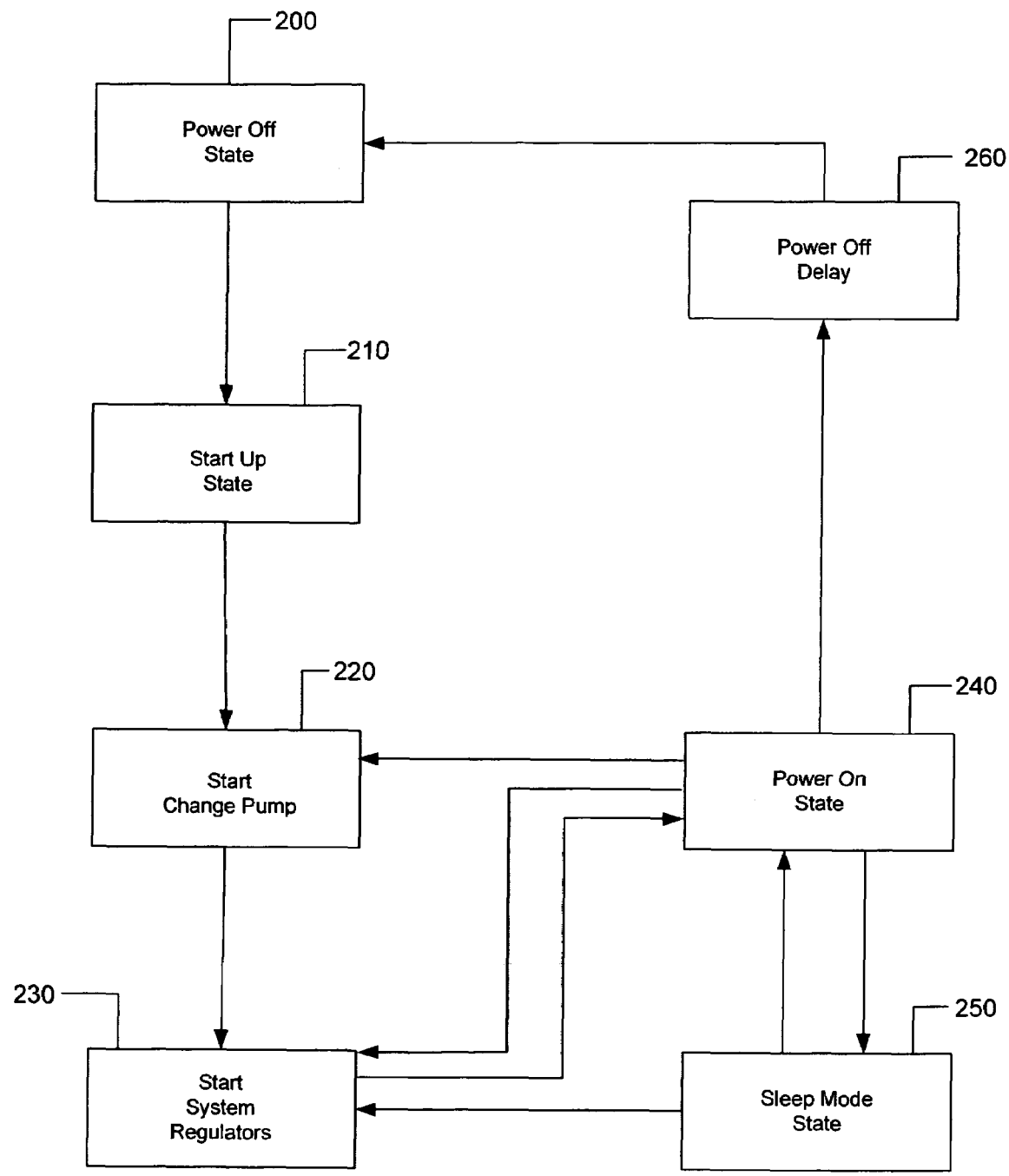
FIG. 2 is a flow chart illustrating an embodiment of a power management system state machine.

FIG. 2 is a flowchart illustrating an embodiment of one possible startup sequence for embodiment 100. Furthermore, the flowchart is not intended in any way to limit the scope of claimed subject matter. With reference to FIG. 2, embodiment 100 begins in a Power Off State 200. An external event, such as a user activating a device associated with embodiment 100, for example, may typically apply one and/or more voltages to startup controller 150, such as those described above with respect to FIG. 1, for example. If the one and/or more voltages achieve a respective threshold value, power management system state machine 155 may transition embodiment 100 into a startup state 210. In startup state 210, startup controller 150 may generate an output signal, such as an output voltage (not shown), for example. The output signal from startup controller 150 may then be applied to charge pump 145. If the output signal from startup controller 150 reaches a respective threshold value, power management system state machine 155 may advance embodiment 100 into a start charge pump state 220 in which charge pump 145 may be initiated. As discussed more fully below, charge pump 145 may generate a charge pump output signal (not shown), such as an output voltage, for example. If the charge pump output voltage meets and/or exceeds a charge pump threshold value, power management system state machine 155 may advance embodiment 100 into a start system regulators state 230 wherein voltage regulators 125, 130, and/or 135 may be initiated. If power management state machine 155 does not detect any errors from the input signals and/or output signals of the voltage regulators 125, 130, and/or 135, power management state machine 155 may advance embodiment 100 to a power on state 240, wherein all or substantially all components and/or circuit components, such as motor drives 110, 115, and 120, for example, of embodiment 100 may be initiated and proceed to a full power operation mode.

Referring to FIG. 2, embodiment 100 may also operate in a sleep mode wherein embodiment 100 may enter into a sleep mode state 250. In sleep mode state 250, some but not all or substantially all of the components and/or circuit components of embodiment 100 may remain in an "on" state. For example, in sleep mode state 250, startup controller 150, power management system state machine 155, and supervisor circuit 160 may be maintained in a full power state while other components and/or circuit components are powered off. In this way, internal events, such as in the case of an all-in-one printer, an incoming fax, copy and/or print request for example, may provide a sufficient voltage to startup controller 150 such that startup controller 150 may initiate the startup sequence, such as that described above, and return embodiment 100 to the power on state. In this context, an internal event may comprise any event originating within embodiment 100, though claimed subject matter is not limited in this regard, for example. In addition, while in sleep mode state 250, an external event, such as a user pressing a button, for example, may likewise provide a sufficient voltage to startup controller 150 such that startup controller 150 may initiate the startup sequence described above and return embodiment 100 to the power on state, as described more fully above. Embodiment 100 may be placed in sleep mode in a variety of ways, including but in no way limited to, an internal timer and/or a user generated event, such as a button push, for example, either of which may generate a signal to power management system state machine 155 to transition the state of embodiment 100 from power on state 240 to sleep mode state 250. Of course, claimed subject matter is not limited to these examples.

Embodiment 100 may return to power off state 200 from power on state 240 in response to an external signal and/or external event, such as a user pushing a button and/or a signal generated by a timer that is triggered after a specified idle time, for example. Such events may prompt power management system state machine 155 to transition embodiment 100 into power off state 200. As part of the process, power management system state machine 155 may place embodiment 100 into a power off delay mode 260. Delay mode 260 may provide a delay, such as a 3-millisecond delay, for example, though other delay periods may also be used, depending upon a variety of factors, including but not limited to the particular apparatus, which may allow associated software systems time to power off associated external circuits, such as motor control integrated circuits (not shown), for example, prior to embodiment 100 entering the power off state. The particular delay period and/or a having delay period in general are mentioned for illustrative purposes and are not intended in any way to limit the scope of claimed subject matter.

Supervisor circuit 160 may include supervisor circuit logic (not shown). In embodiment 100, supervisor circuit 160 monitors any and/or all of the following parameters for the above mentioned components of embodiment 100: a system supply voltage, 32 volts, for example; an analog bias voltage; temperature sensor circuits (not shown); and timer circuits (not shown). If any one of the above parameters deviates from a defined range of acceptable values, for this particular embodiment, supervisor circuit 160 may generate an appropriate reset signal which may result in power management system state machine 155 transitioning embodiment 100 into one of a set of safe states, as described more fully below. In this context, the term safe states refers to states of the embodiment in which the embodiment, such as a circuit embodiment, for example, may be placed if one or more errors occur so that the error and/or errors result in no harm or a limited amount of harm to the particular embodiment. Of course, the particular monitored parameters discussed above are merely examples and are in no way intended to limit the scope of claimed subject matter.

The following is merely an example of the operation of an embodiment of power management system state machine 155 and an embodiment of supervisor circuit 160 and is in no way intended to limit the scope of claimed subject matter. By way of example, assume that embodiment 100 is in the power on state, as described above. If voltage regulator 125, for example, a 3.3 volt regulator, encounters an error, such as a ground fault, then the output value of voltage regulator 125 may fall below an associated under-voltage threshold. Supervisor circuit 160 which may be monitoring many and/or all of the above described components, such as regulator 125, may therefore detect the fault due to the under-voltage condition. Supervisor logic may then generate a reset signal associated with a failure of voltage regulator 125. In response to the generated reset signal, power management system state machine 155 may transition embodiment 100 into start system regulators state 230, which in the case of an error in voltage regulator 125 is a safe state for this embodiment. In system regulators state 230, embodiment 100 may attempt to again initiate voltage regulator 125. If voltage regulator 125 now produces a proper output voltage, then power management system state machine 155 may advance embodiment 100 into power on state 240, as previously described. If, however, voltage regulator 125 continues to output a voltage that is outside of the acceptable range, then power management system state machine 155 will not advance to power on state 240, and will, instead, continue to attempt to re-initiate voltage regulator 125. In this way, embodiment 100 typically will not remain in a state in which an error is occurring. Power management system state machine 155 and supervisor circuit 160 will, instead, transition embodiment 100 into a safe state, as illustrated by previous examples, for example. Of course, the particular states and/or errors discussed above are merely examples and are in no way intended to limit the scope of claimed subject matter.

Figure 3:
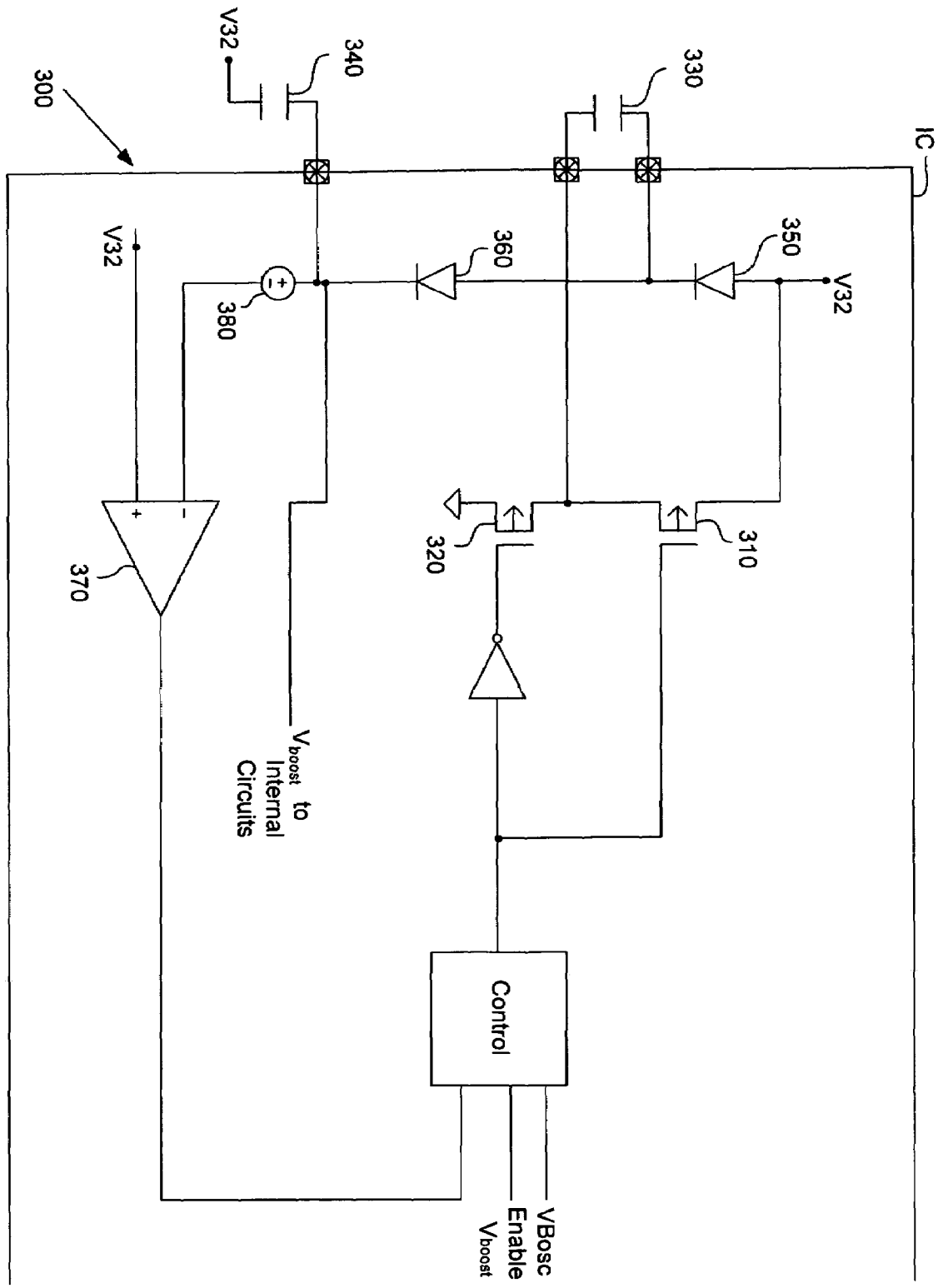
FIG. 3 is a schematic diagram illustrating an embodiment of a charge pump.

As previously described, embodiment 100 may also include a charge pump, although, again, claimed subject matter is not limit in scope to including a charge pump. FIG. 3 illustrates one potential embodiment of a charge pump. Here, the charge pump is employed to provide a voltage source greater than 32 V to assist in turning on negative-channel metal-oxide semiconductor (NMOS) devices that may be located elsewhere on embodiment 100. This is, of course, just one possible application of a charge pump and claimed subject matter is not limited in scope to this particular application. However, as illustrated in FIG. 3, this embodiment operates by switching transistors, or here, field effect transistors (FETs), 310 and 320 so that charge is first accumulated on capacitor 330 followed by dumping that charge from capacitor 330 to capacitor 340. Thus, FET 320 is turned on first, in this embodiment. Current flows from voltage source V32 through diode 350 through capacitor 330 and through FET 320. Thus, capacitor 330 is charged to 32 volts. After capacitor 330 is charged, FET 320 switches off and FET 310 switches on. Current then flows from voltage source V32 through FET 310 through capacitor 330 and through diode 360 into capacitor 340. Thus, capacitor 340 is charged to above 32 volts. Comparator 370 and internal voltage source 380 are used to determine how far above 32 volts to charge capacitor 340. Again, this is merely one example embodiment and claimed subject matter is not limited in scope to one example.

Figure 4:
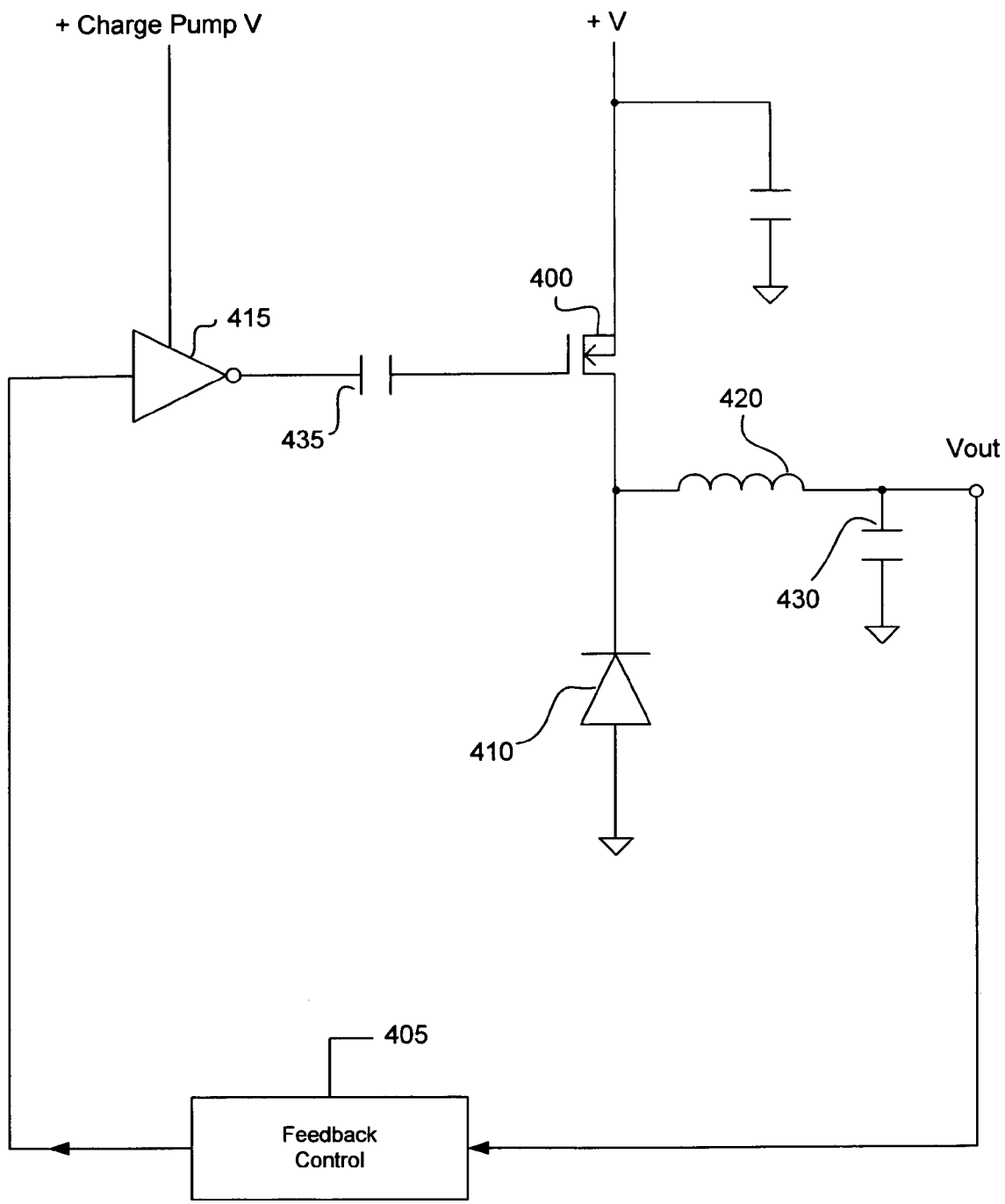
FIG. 4 is a schematic diagram illustrating an embodiment of a DC-DC voltage regulator.

An embodiment of a switching voltage regulator configuration is illustrated in FIG. 4, although, of course, this is also simply one example. In the embodiment shown in FIG. 4, one FET is employed. This embodiment includes a high-side FET, 400, and a low-side diode, 410, although a variety of other embodiments may alternatively be employed. For example, 410 might instead comprise another FET. Here, 400 may comprise a N-channel FET, for example, though a P-channel FET may be used in some designs as well, and of course claimed subject matter is not limited in this regard. As illustrated, FET 400 provides a signal path to inductor 420. Although not illustrated in detail, the filtered voltage output signal is provided by inductor 420 and capacitance 430 to feedback control circuitry 405 in FIG. 4. This particular feedback control circuitry provides a feedback signal to FET driver 415. Thus, based at least in part on the output voltage signal level, the feedback control circuitry operates to adjust the output voltage signal level produced by driving the input port of the FET. Of course, the feedback signal could be directly coupled to the FET alternatively. Here, however, in this embodiment, capacitor 435 is interposed to filter out DC bias from the signal applied to the FET. As previously discussed, this is merely one potential embodiment out of a myriad of potential circuits that may be employed.

Figure 5:
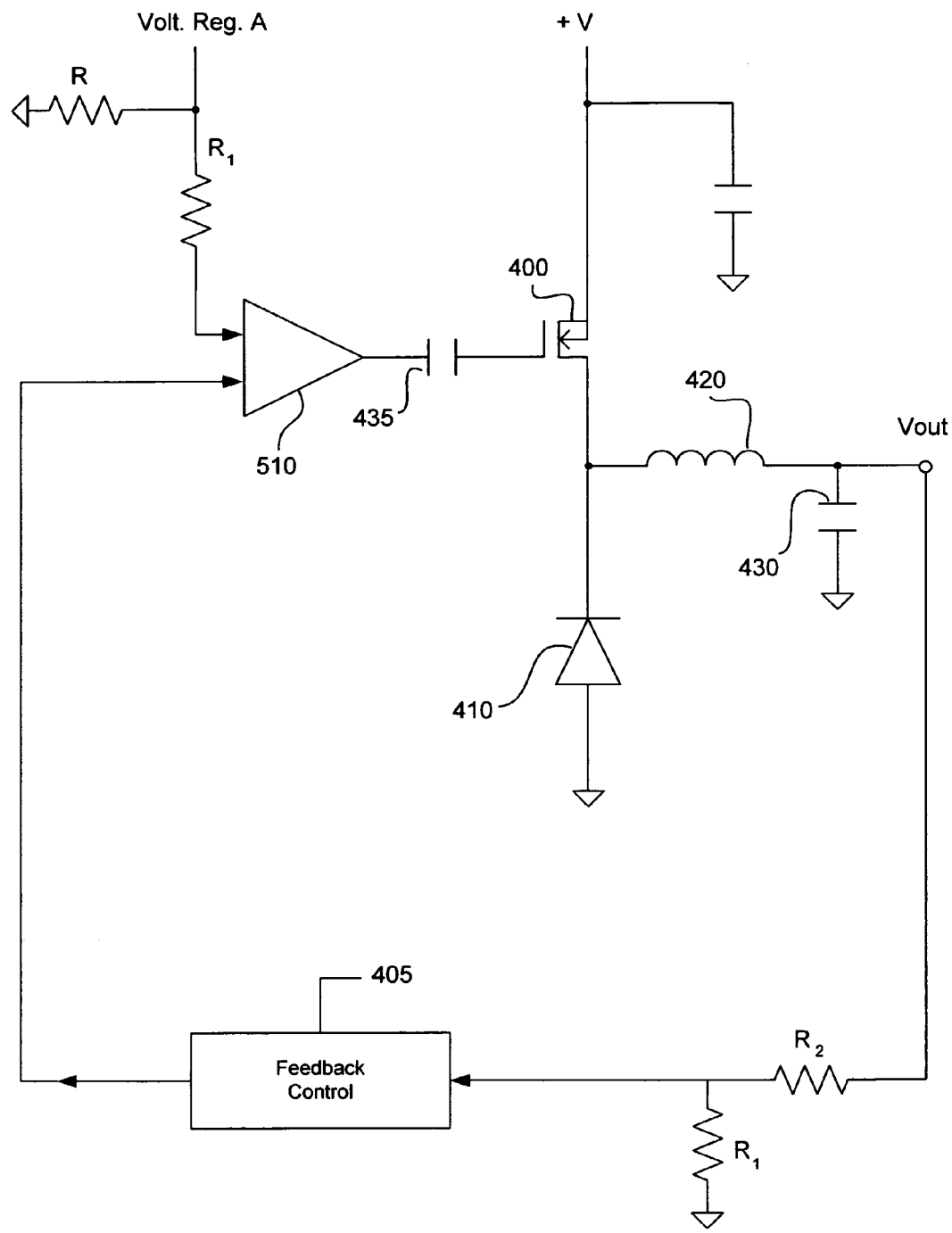
FIG. 5 is a schematic diagram illustrating another embodiment of a DC-DC voltage regulator.

Embodiment 100 may include two auxiliary voltage regulators, 130 and 135. The output voltage of these switching voltage regulators may be set based, at least in part, upon the application of an external signal. For this embodiment, although, of course, claimed subject matter is not limited in scope in this respect, these regulators may be set to a voltage level from 1 volt to 16 volts. This may be implemented any one of a number of ways and claimed subject matter is not limited to a particular approach; however, FIG. 5 illustrates one potential technique. Thus, for the embodiment shown in FIG. 5, the feedback signal is applied to a comparator 510 and compared with a reference signal, such as voltage regulator signal A, for example. Adjusting R, which may in this context be an externally provided resistance, adjusts the reference signal, which adjusts the output voltage signal, for example. Likewise, as previously described, any one of a number of switching voltage regulators may be employed for 130 and 135 and claimed subject matter is not limited in scope to a particular type of switching voltage regulator.

As suggested above, in addition to switching power regulators, embodiment 100 may include switching power motor drive circuits or circuitry, such as 110, 115 and 120. These circuits may provide power signals to drive a motor external to embodiment 100. Although claimed subject matter is not limited in scope in this respect, these motor drive circuits may include an H-bridge circuit. In this context, an H-bridge circuit refers to a circuit having an H configuration, as shown in FIG. 6, for example, in which the switching elements of the circuit may apply current to a DC motor that adjusts the duty cycle of the motor by adjusting the duty cycle of the applied voltage.

Figure 6:
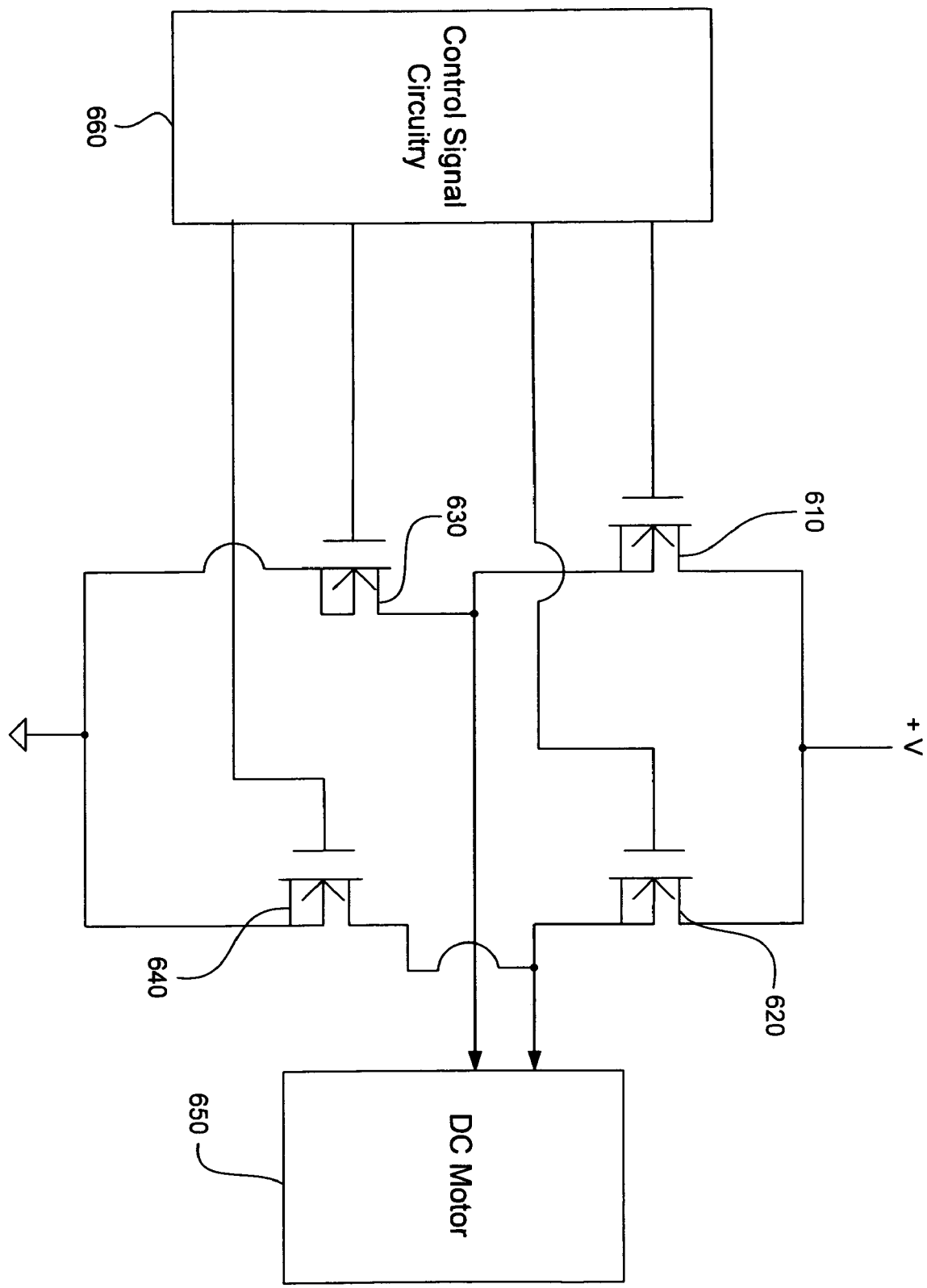
FIG. 6 is a schematic diagram illustrating an embodiment of an H-bridge and DC motor.

Referring to FIG. 6, a DC motor 650 may be electrically coupled in the form of an H-bridge circuit that includes four switching elements, 610, 620, 630 and 640, here FETs. Control signal circuitry 660 applies voltage signals to the gates of the FETs to switch the states of the switching elements. These elements may be employed to control or adjust the rotation speed of the DC motor, by adjusting the duty cycle of a pulse voltage applied to the motor, and to reverse the direction of rotation by changing the polarity of the applied voltage. Switching elements 610 and 620 are coupled to a power supply V, while elements 630 and 640 are coupled to ground. The motor has one terminal coupled to the junction between 610 and 630 and the other coupled to the junction between 620 and 640. By combining the switching operation of 610-640, bi-directional speed control may be realized by adjusting the voltage applied to the DC motor. For example, when elements 620 and 630 are on and elements 610 and 640 are off, current flows from the power source to ground via 620 and 630. This results in the motor rotating in a forward direction. Likewise, if 610 and 640 are on while 620 and 630 are off, this results in reverse current flow and, consequently, the motor rotating in an opposite direction.

Figure 7:
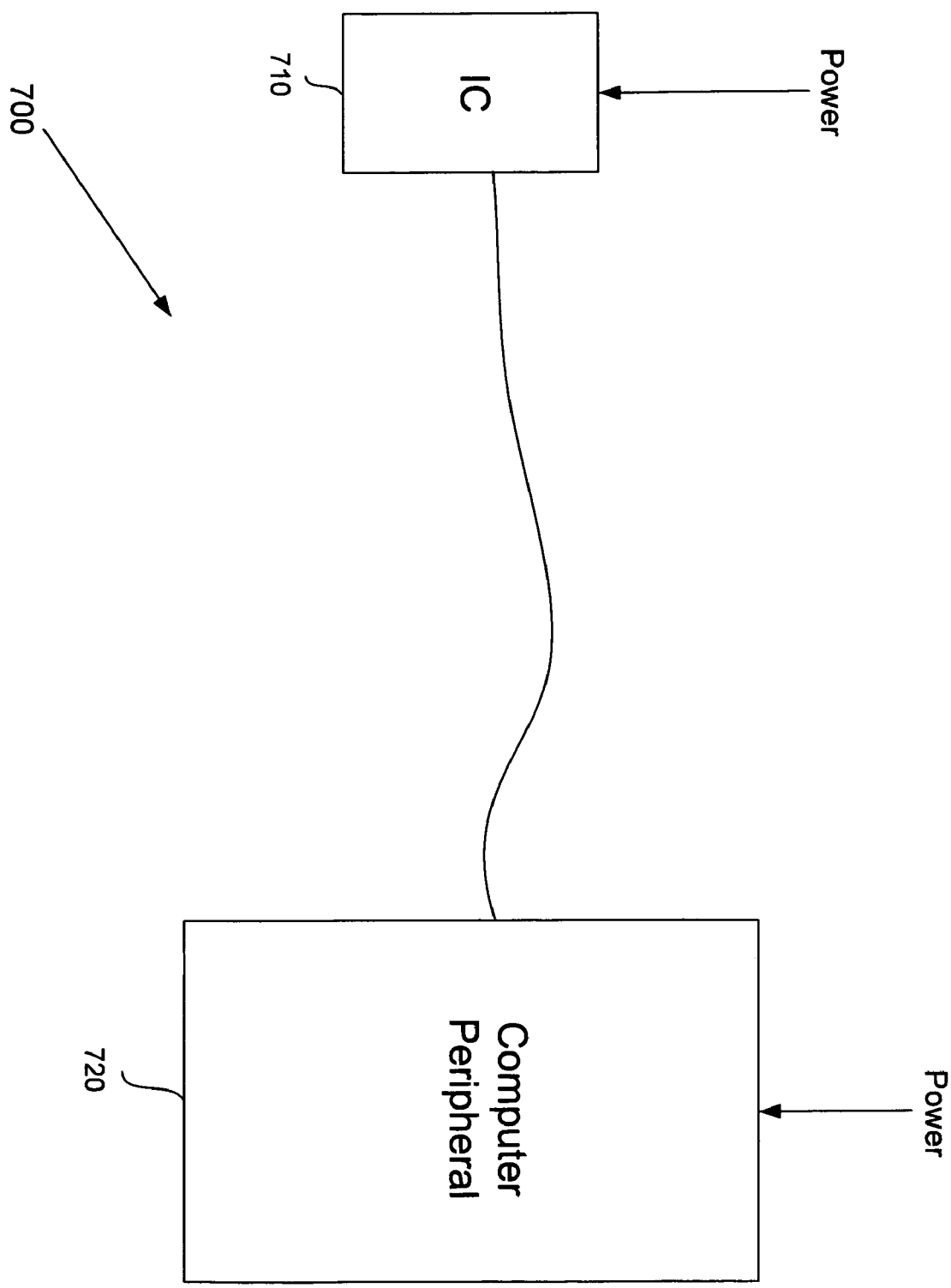
FIG. 7 is a schematic diagram illustrating an embodiment of a system that includes an embodiment of a power-consuming device, such as a computer peripheral.

FIG. 7 illustrates an embodiment 700 of a system that may include an IC 710 including a switching voltage regulator and/or a switching motor drive circuit, as previously described, for example, coupled to a power consuming device 720, such as a computer peripheral, for example. Although claimed subject matter is not limited in scope in this respect, motors, for example, may be employed in any one of a number of potential external devices, including, for example, a computer peripheral device, such as a printer, scanner, copier, a facsimile machine and/or any combination thereof, for example. Other devices may include digital cameras, such as digital still or digital video cameras, cell phones, personal digital assistants, televisions, radios, DVD players, CD players, cassette players, hard drives, DVD burners, CD burners, floppy drives, electronic game devices, etc.

As previously described, FIG. 1 and the previously described circuitry are merely example embodiments and claimed subject matter is not limited in scope in any way to employing the previously described circuitry. Thus, other circuitry may be employed instead of or in addition to that previously described. Thus, claimed subject matter is not limited in scope to the particular type of switching power devices illustrated in FIG. 1. For example, other types of switching power devices include circuits to drive compressors, such as for a refrigerator or air conditioner, circuits to drive lighting, such as lamps or other lighting apparatuses, circuits to drive displays, circuits to drive appliances, such as blenders, toasters, mixers, and the like, circuits to drive electronic toys, circuits to drive televisions, stereos, DVD players and CD players, and/or any other type of switching power driver circuit now in existence and/or developed later. Thus, any device that consumes power including a switching driver or regulator circuit is included within the scope of claimed subject matter.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, features that would be understood by one of ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A power management system comprising:
a state machine, capable of transitioning the power management system to a safe state when an input signal and/or an output signal from a component of the power management system indicates occurrence of an error in the components,
wherein the state machine is operable to transition the power management system into a start charge pump state wherein an activation voltage is applied to a charge pump associated with the power managements system when no errors are detected during a startup state, transition the power management system into a start system regulators state wherein a voltage regulator associated with the power management system is initiated when no errors are detected during the start charge pump state, and transition the power management system into a power on state wherein an activation voltage is applied to the component of the power management system when no errors are detected during the start system regulators state.

2. The power management system of claim 1, wherein the power management system is adapted to provide a delay in response to the state machine entering a start state, such that an event provided to a system startup circuit has sufficient time to reach a threshold value before the state machine advances the power management system to a subsequent state.

3. The power management system of claim 1 wherein the state machine is adapted to provide a delay in transitioning the power management system into a power off state from a power on state such that at least one external circuit may be set to an off state prior to the state machine transitioning the power management system into the power off state.

4. The power management system of claim 3 wherein said delay is such that a plurality of external circuits may be set to an off state prior to the state machine transitioning the power management system into the power off state.

5. The power management system of claim 1, and further comprising a set of state conditions, each corresponding to one of a set of defined input signals and/or defined output signals of a plurality of components of the power management system.

6. The power management system of claim 1, wherein, in response to a user generated event, the state machine is operable to transition the power management system into a system startup state wherein an activation voltage is applied to a startup controller of the power management system.

7. The power management system of claim 5, wherein activation voltages are applied to the plurality of components of the power management system when no errors are detected during the start system regulators state.

8. The power management system of claim 5, wherein the state machine is operable to transition the power management system into a sleep mode state wherein the plurality of components of the power management system are transitioned to a low power state, and wherein the state machine is operable to return the power management system to the power on state in response to an internal and/or external event.

9. The power management system of claim 5, wherein the state machine is operable to transition the power management system into a power off state wherein the plurality of components, the charge pump, and the voltage regulator of the power management system are transitioned into a power off state.

10. The power management system of claim 5, wherein the plurality of components comprises at least one motor drive circuit and/or at least one communication circuit.

11. The power management system of claim 1, wherein the state machine is operable to transition the power management system into the power on state in response to an internal and/or external event.

12. The power management system of claim 11, wherein the external event comprises a user generated event.

13. A method of power management for a component, comprising:
    enabling a charge pump if an output signal supplied to the charge pump from a start-up controller for the component exceeds a first voltage signal level;
    after enabling the charge pump, generating an output voltage with the charge pump;
    enabling a voltage regulator if the output voltage of the charge pump exceeds a second voltage signal level;
    monitoring input signals and output signals of the voltage regulator for errors during the enabling of the voltage regulator; and
    if no error has occurred during the enabling of the voltage regulator, entering a power on state for the component.

14. The method of claim 13, and further comprising monitoring input signals and output signals of said charge pump, said controller and said voltage regulator.

15. The method of claim 14, and further comprising transitioning from said power on state to a safe state if a monitored input signal and/or output signal is outside of a desired input signal range and/or output signal range.

16. The method of claim 15, and further comprising transitioning from said safe state to said power on state if said monitored input signal and/or output signal is within said desired input signal range and/or output signal range.

17. The method of claim 13, and further comprising transitioning from said power on state to a low power state in response to a first event.

18. The method of claim 17, and further comprising transitioning from said low power state to said power on state in response to a second event.

19. The method of claim 17, wherein said first event comprises an internal event and/or an external event.

20. The method of claim 18, wherein said second event comprises an internal event and/or an external event.

21. An article comprising: a storage media having stored thereon instructions that when executed result in power management for a component comprising:
    enabling a charge pump if an output signal supplied to the, charge pump from a start-up controller for the component exceeds a first voltage signal level;
    after enabling the charge pump, generating an output voltage with the charge pump;
    enabling a voltage regulator if the output voltage of the charge pump exceeds a second voltage signal level;
    monitoring input signals and output signals of the voltage regulator for errors during the enabling of the voltage regulator; and
    if no error has occurred during the enabling of the voltage regulator, entering a power on state for the component.

22. The article of claim 21, wherein said instructions when executed further result in monitoring input signals and output signals of said charge pump, said controller and said voltage regulator.

23. The article of claim 22, wherein said instructions when executed further result in transitioning from said power on state to a safe state if a monitored input signal and/or output signal is outside of a desired input signal range and/or output signal range.

24. The article of claim 23, wherein said instructions when executed further result in transitioning from said safe state to said power on state if said monitored input signal and/or output signal is within said desired input signal range and/or output signal range.

25. The article of claim 21, wherein said instructions when executed further result in transitioning from said power on state to a low power state in response to a first event.

26. The article of claim 25, wherein said instructions when executed further result in transitioning from said low power state to said power on state in response to a second event.

27. The article of claim 25, wherein said first event comprises an internal event and/or an external event.

28. The article of claim 26, wherein said second event comprises an internal event and/or an external event.

* * * * *

UNITED STATES PATENT AND TRADEMARK OFFICE
CERTIFICATE OF CORRECTION

PATENT NO. : 7,418,604 B2 Page 1 of 1
APPLICATION NO. : 11/021083
DATED : August 26, 2008
INVENTOR(S) : Paul D. Bliley et al.

It is certified that error appears in the above-identified patent and that said Letters Patent is hereby corrected as shown below:

In column 8, line 28, in Claim 1, delete "components," and insert -- component, --, therefor.

In column 8, line 32, in Claim 1, delete "managements" and insert -- management --, therefor.

In column 8, line 50, in Claim 3, delete "claim 1" and insert -- claim 1, --, therefor.

In column 10, line 14, in Claim 21, after "supplied to the" delete ",".

Signed and Sealed this

Second Day of December, 2008

JON W. DUDAS
*Director of the United States Patent and Trademark Office*